(12) United States Patent
Nagaosa

(10) Patent No.: US 9,105,891 B2
(45) Date of Patent: Aug. 11, 2015

(54) FUEL CELL SYSTEM AND CONTROL METHOD FOR FUEL CELL SYSTEM

(75) Inventor: Hideo Nagaosa, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 172 days.

(21) Appl. No.: 13/521,898

(22) PCT Filed: Jan. 11, 2011

(86) PCT No.: PCT/IB2011/000026
§ 371 (c)(1),
(2), (4) Date: Jul. 12, 2012

(87) PCT Pub. No.: WO2011/086448
PCT Pub. Date: Jul. 21, 2011

(65) Prior Publication Data
US 2012/0288776 A1 Nov. 15, 2012

(30) Foreign Application Priority Data
Jan. 12, 2010 (JP) ................ 2010-004403

(51) Int. Cl.
*H01M 8/04* (2006.01)
*C01B 3/04* (2006.01)
*H01M 8/06* (2006.01)
*H01M 8/10* (2006.01)

(52) U.S. Cl.
CPC .......... *H01M 8/04492* (2013.01); *C01B 3/047* (2013.01); *H01M 8/045* (2013.01); *H01M 8/04611* (2013.01); *H01M 8/04641* (2013.01); *H01M 8/04776* (2013.01); *H01M 8/0612* (2013.01); *C01B 2203/066* (2013.01); *C01B 2203/1604* (2013.01); *C01B 2203/1685* (2013.01); *C01B 2203/1695* (2013.01); *H01M 8/04* (2013.01); *H01M 8/06* (2013.01); *H01M 2008/1095* (2013.01); *Y02E 60/364* (2013.01); *Y02E 60/50* (2013.01)

(58) Field of Classification Search
USPC ........................................................ 429/423
See application file for complete search history.

(56) References Cited

U.S. PATENT DOCUMENTS

2003/0148157 A1* 8/2003 Grasso et al. .................... 429/26
2004/0197620 A1* 10/2004 Arthur ............................ 429/22
(Continued)

FOREIGN PATENT DOCUMENTS

JP          63-94564 A      4/1988
JP          01-38969 A      2/1989
(Continued)

OTHER PUBLICATIONS

International Search Report and Written Opinion for corresponding International Patent Application No. PCT/IB2011/000026 mailed Jul. 26, 2011.
(Continued)

*Primary Examiner* — Miriam Stagg
*Assistant Examiner* — Carmen Lyles-Irving
(74) *Attorney, Agent, or Firm* — Sughrue Mion, PLLC

(57) ABSTRACT

A fuel cell system includes a fuel cell of a solid polymer type that generates power by using a hydrogen-containing gas as a fuel gas, a reformer that generates the fuel gas by reforming ammonia, and a supply amount ratio control unit that controls a supply amount ratio of oxygen and ammonia to be supplied the reformer.

6 Claims, 7 Drawing Sheets

(56) References Cited

U.S. PATENT DOCUMENTS

| | | |
|---|---|---|
| 2009/0114545 A1 | 5/2009 | Schmit et al. |
| 2009/0136788 A1* | 5/2009 | Koenig et al. .................... 429/13 |

FOREIGN PATENT DOCUMENTS

| | | |
|---|---|---|
| JP | 2002008692 A | 1/2002 |
| JP | 2002-134151 A | 5/2002 |
| JP | 2003-040602 A | 2/2003 |
| JP | 2005-145748 A | 6/2005 |
| JP | 2006-032236 A | 2/2006 |
| JP | 2008-536795 A | 9/2008 |
| JP | 2010-180075 A | 8/2010 |
| JP | 2010-180098 A | 8/2010 |
| JP | 2010-241647 A | 10/2010 |
| WO | 02/08117 A1 | 1/2002 |

OTHER PUBLICATIONS

Japanese Office Action for corresponding JP Patent Application No. 2010-004403 issued on Nov. 11, 2011.

* cited by examiner

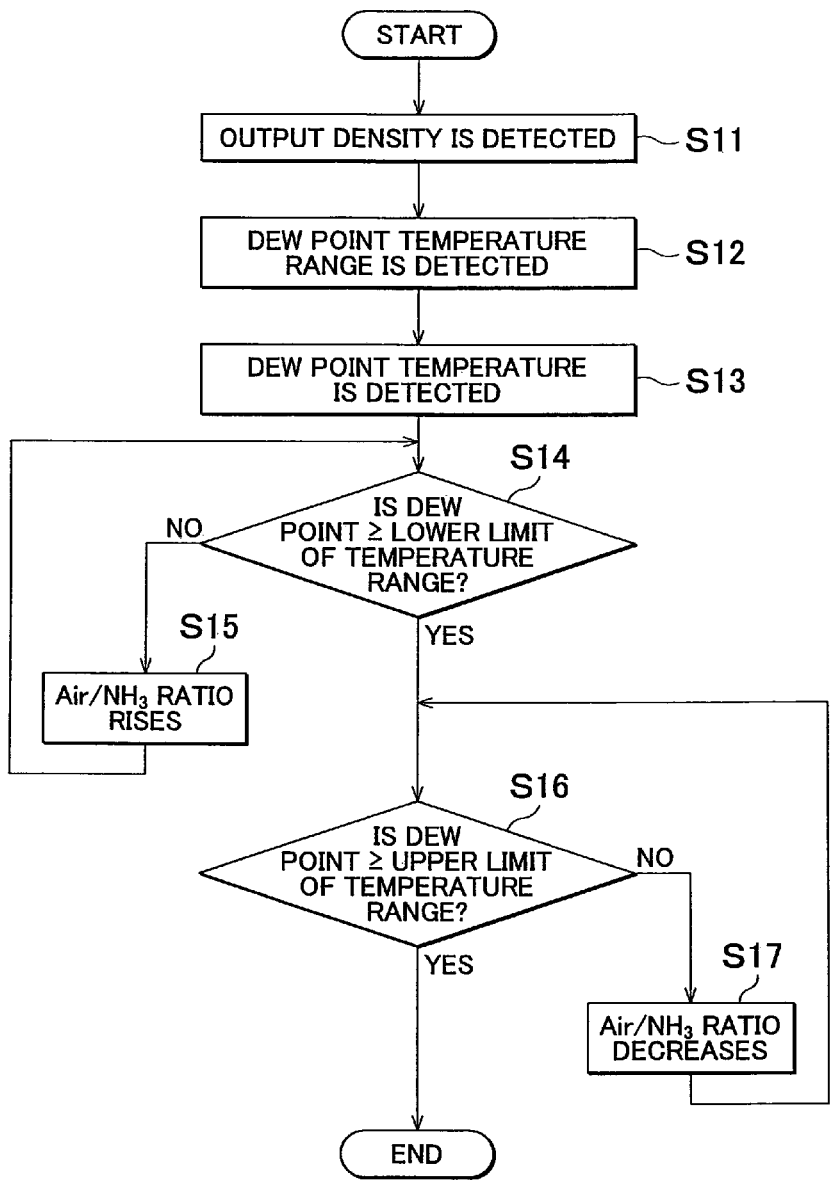

FUEL CELL SYSTEM AND CONTROL METHOD FOR FUEL CELL SYSTEM

BACKGROUND OF THE INVENTION

1. Field of the Invention

The invention relates to a fuel cell system and a control method for the fuel cell system.

2. Description of the Related Art

A fuel cell is generally a device that obtains electric energy by using hydrogen and oxygen as fuel. Since fuel cells have excellent environmental friendliness and can realize a high energy efficiency, they have been actively developed as energy supply systems of the future. In particular, among various types of fuel cells, solid polymer fuel cells have good start ability because they are actuated at a comparatively low temperature. Accordingly, solid polymer fuel cells have been intensively researched for applications in a variety of field.

Fuel gas used for power generation in a fuel cell is generated by a reformer or the like. For example, Japanese Patent Application Publication No. 2005-145748 (JP-A-2005-145748) describes providing hydrogen-containing gas obtained by thermal decomposition of ammonia to a fuel cell as a fuel gas.

However, proton conductivity of a solid polymer electrolyte membrane of a fuel cell decreases with the decrease in moisture content. Therefore, the solid polymer electrolyte membrane should include an appropriate amount of water. In JP-A-2005-145748, no water is contained in the fuel gas because no water is generated by thermal decomposition of ammonia in the reformer. Therefore, with the fuel gas obtained by thermal decomposition of ammonia, the solid polymer electrolyte membrane is not humidified. In this case, power generation efficiency can decrease.

SUMMARY OF INVENTION

The invention provides a fuel cell system in which a fuel cell is humidified by using a fuel gas obtained by reforming ammonia and also provides a control method for the fuel cell system.

One aspect of the invention relates to a fuel cell system including: a fuel cell of a solid polymer type that generates power by using a hydrogen-containing gas as a fuel gas; a reformer that generates the fuel gas by reforming ammonia; and a supply amount ratio control unit that controls a supply amount ratio of oxygen and ammonia to be supplied to the reformer. In this fuel cell system, by controlling the supply amount ratio of oxygen and ammonia to be supplied to the reformer, it is possible to humidify the fuel cell easily by using the fuel gas obtained by reforming ammonia.

The fuel cell system further includes a wetness state detection unit that detects a wetness state of the fuel cell, and the supply amount ratio control unit may control a supply amount ratio of oxygen and ammonia to be supplied to the reformer according to the detection result of the wetness state detection unit. In this case, the fuel cell can be easily humidified according to the wetness state of the fuel cell. The supply amount ratio control unit may control a supply amount ratio of oxygen and ammonia to be supplied to the reformer in a predetermined range according to the detection result of the wetness state detection unit.

The fuel cell system may further include an operation state detection unit that detects an operation state of the fuel cell, and the supply amount ratio control unit may control a supply amount ratio of oxygen and ammonia to be supplied the reformer according to the detection result of the operation state detection unit. In this case, the fuel cell can be easily humidified according to the operation state of the fuel cell. The supply amount ratio control unit may control a supply amount ratio of oxygen and ammonia to be supplied the reformer in a predetermined range according to the detection result of the operation state detection unit.

The wetness state detection unit may be a dew point sensor that detects a dew point of the fuel gas. The wetness state detection unit may be a resistance sensor that detects a membrane resistance of an electrolyte membrane of the fuel cell. The wetness state detection unit may be a humidity sensor that detects a relative humidity of the fuel gas. The operation state detection unit may be a means for detecting an output density of the fuel cell. The supply amount ratio control unit may control a supply amount ratio of oxygen and ammonia to be supplied the reformer to a value equal to or less than 0.90.

The second aspect of the invention relates to a control method for a fuel cell system including: a fuel cell of a solid polymer type that generates power by using a hydrogen-containing gas as a fuel gas; and a reformer that generates the fuel gas by reforming ammonia. The control method includes controlling a supply amount ratio of oxygen and ammonia to be supplied to the reformer. With the control method for a fuel cell system according to the invention, by controlling the supply amount ratio of oxygen and ammonia to be supplied to the reformer, it is possible to humidify the fuel cell easily by using a fuel gas obtained by reforming ammonia.

The control method may include detecting a wetness state of the fuel cell and controlling a supply amount ratio of oxygen and ammonia to be supplied to the reformer according to the detected wetness state of the fuel cell. In this state, the fuel cell can be easily humidified according to the wetness state of the fuel cell. The supply amount ratio of oxygen and ammonia may be controlled to a predetermined range according to the detected wetness state of the fuel cell.

The above-described method may further include detecting an operation state of the fuel cell and controlling a supply amount ratio of oxygen and ammonia to be supplied to the reformer according to the detected operation state of the fuel cell. In this case, the fuel cell can be easily humidified according to the operation state of the fuel cell. Further, the supply amount ratio of oxygen and ammonia is controlled to a predetermined range according to the detected operation state of the fuel cell.

In the above-described configuration, the wetness state of the fuel cell may be acquired by detecting a dew point of the fuel gas. Further, in the above-described configuration, the wetness state of the fuel cell may be acquired by detecting a membrane resistance of an electrolyte membrane of the fuel cell. Further, in the above-described configuration, the wetness state of the fuel cell may be acquired by detecting a relative humidity of the fuel gas. In the above-described configuration, the operation state of the fuel cell may be acquired by detecting an output density of the fuel cell. Further, in the above-described configuration, the supply amount ratio of oxygen and ammonia to be supplied to the reformer may be controlled to a value equal to or less than 0.90.

With the fuel cell system and control method for the fuel cell system in accordance with the invention, the fuel cell can be humidified by using the fuel gas obtained by reforming ammonia.

BRIEF DESCRIPTION OF DRAWINGS

The foregoing and further object, features and advantages of the invention will become apparent from the following description of example embodiments with reference to the accompanying drawings, wherein like numerals denote are used to represent like elements, and wherein:

FIG. 6 is a flowchart relating to the case in which an output density of the fuel cell is taken into account.

DETAILED DESCRIPTION OF EMBODIMENTS

The invention will be explained below on the basis of example embodiments thereof.

Figure 1:
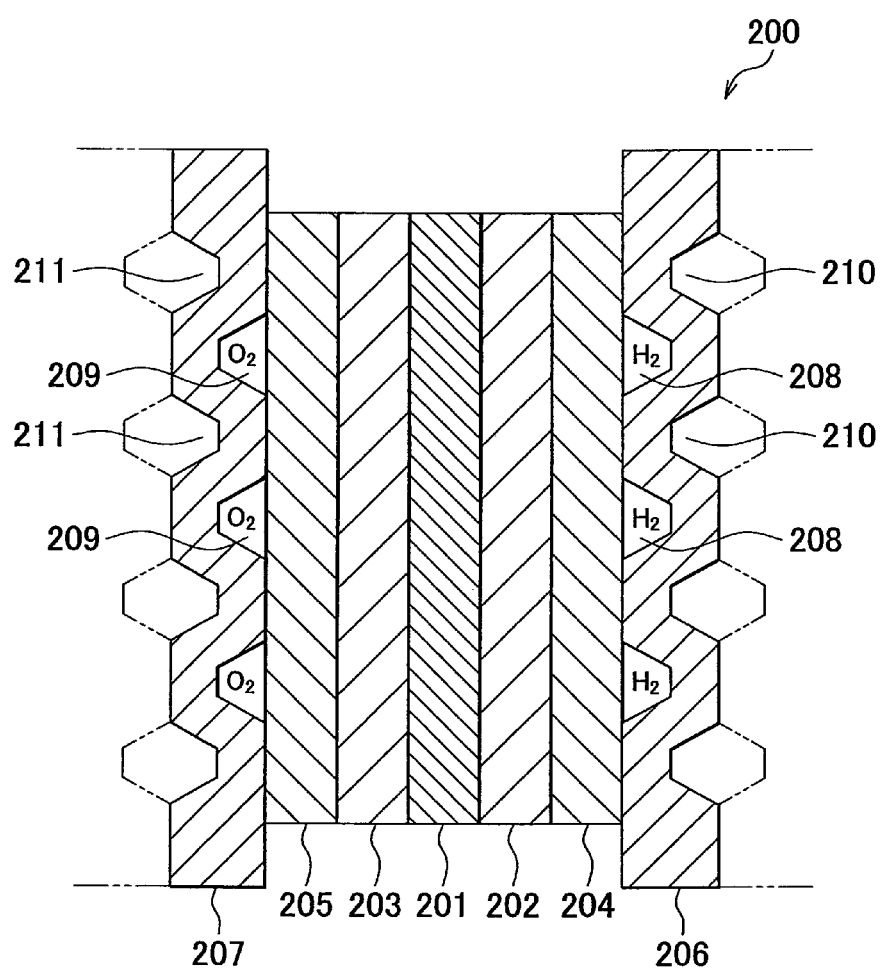
FIG. 1 is a schematic cross-sectional view of a cell.

A fuel cell system 5 according to the first embodiment of the invention is explained below. First, a fuel cell 50 used in the fuel cell system 5 will be explained. The fuel cell 50 is constituted by a stack of a plurality of cells 200. FIG. 1 is a schematic cross-sectional view of the cell 200. The cell 200 includes an electrolyte membrane 201, an anode catalyst layer 202, a cathode catalyst layer 203, a first gas diffusion layer 204, a second gas diffusion layer 205, a first separator 206, and a second separator 207. A solid polymer electrolyte membrane having proton conductivity can be used as the electrolyte membrane 201.

The anode catalyst layer 202 and the cathode catalyst layer 203 are disposed so as to sandwich the electrolyte membrane 201. The anode catalyst layer 202 is made from a conductive material including a catalyst that enhances protonization of hydrogen. The cathode catalyst layer 203 is made from a conductive material including a catalyst that enhances a reaction of protons and oxygen. For example, carbon supporting platinum can be used as the anode catalyst layer 202 and the cathode catalyst layer 203.

The first gas diffusion layer 204 is disposed on the side of the anode catalyst layer 202 opposite to the electrolyte membrane 201. The second gas diffusion layer 205 is disposed on the side of the cathode catalyst layer 203 opposite to the electrolyte membrane 201. The first gas diffusion layer 204 and the second gas diffusion layer 205 are made from materials having electric conductivity and gas permeability. For example, carbon fibers in the form of carbon paper or carbon cloth can be used as the material having electric conductivity and gas permeability.

The first separator 206 and the second separator 207 are made from a conductive material such as stainless steel. A fuel gas flow path 208 in which fuel gas flows is formed in the surface of the first separator 206 on the electrolyte membrane 201 side. A first coolant flow path 210 in which a coolant flows is formed in the surface of the first separator 206 opposite to the electrolyte membrane 201. An oxidizer gas flow path 209 in which oxidizer gas flows is formed in the surface of the second separator 207 on the electrolyte membrane 201 side. A second coolant flow path 211 in which the coolant flows is formed in the surface of the second separator 207 on the side opposite to the electrolyte membrane 201. For example, the fuel gas flow path 208, oxidizer gas flow path 209, first coolant flow path 210, and second coolant flow path 211 are constituted by recesses formed in the surface of the first separator 206 and the second separator 207.

When power is generated, the cell 200 operates in the following manner. The oxidizer gas supplied to the cell 200 passes through the oxidizer gas flow path 209, diffuses in the second gas diffusion layer 205, and then reaches the cathode catalyst layer 203. The fuel gas supplied to the cell 200 passes through the fuel gas flow path 208, diffuses in the first gas diffusion layer 204, and then reaches the anode catalyst layer 202.

Hydrogen (H$_2$) contained in the fuel gas that has reached the anode catalyst layer 202 is separated by the catalyst into protons and electrons. The protons are conducted by the electrolyte membrane 201 and reach the cathode catalyst layer 203. In the cathode catalyst layer 203, water (H$_2$O) is generated by the catalyst from the oxygen (O$_2$) contained in the oxidizer gas and the protons conducted by the electrolyte membrane 201 and power is generated. The generated power is taken to the outside. The fuel gas that has not been used for power generation is discharged as a fuel off-gas from the cell 200. The oxidizer gas that has not been used for power generation is discharged as an oxidizer off-gas from the cell 200. When power is generated, the cell 200 operates as described above.

Figure 2:
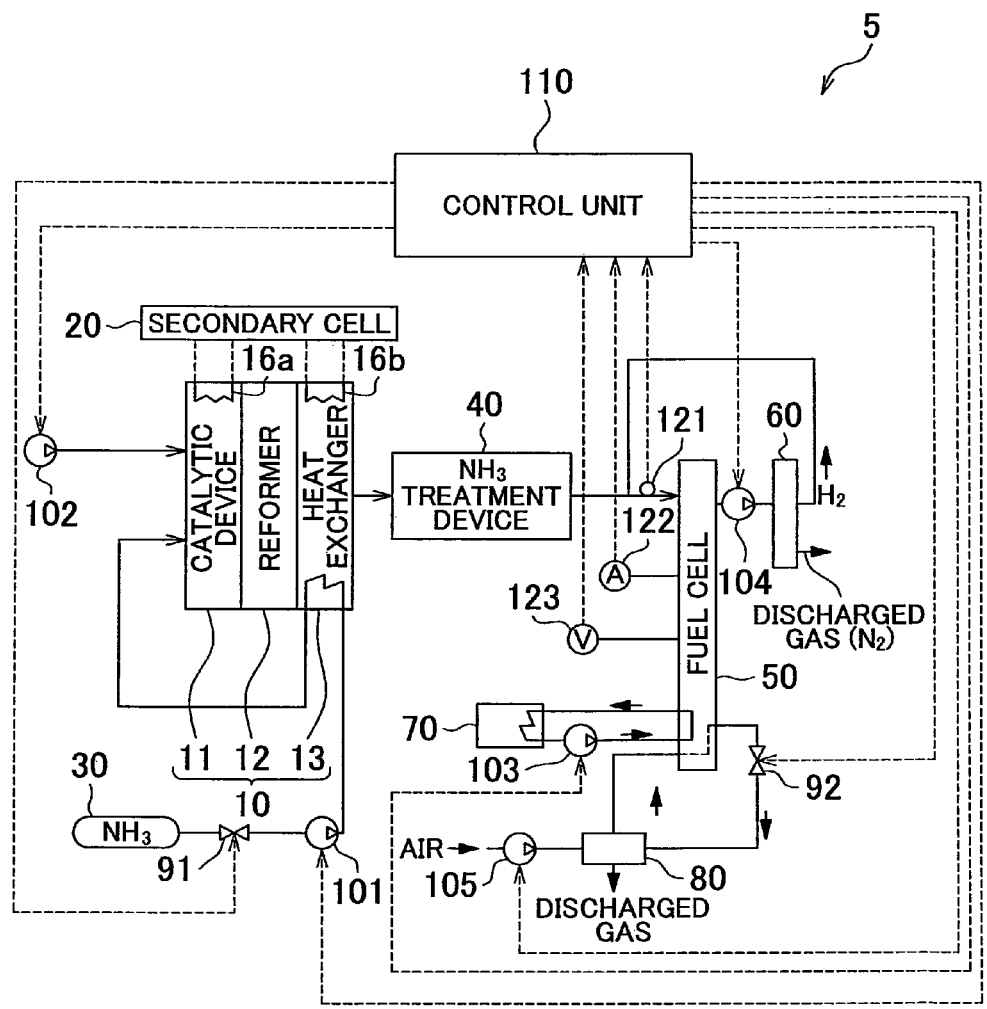
FIG. 2 is a schematic drawing illustrating a configuration of a fuel cell system.

FIG. 2 is a block diagram illustrating the configuration of the fuel cell system 5. The fuel cell system 5 is a fuel cell system using a reformed gas as the fuel gas. The configuration of the fuel cell system 5 will be explained below with reference to FIG. 2. The fuel cell system 5 includes a reforming device 10, a secondary cell 20, a storage tank 30, a NH$_3$ treatment device 40, a fuel cell 50, a hydrogen recovery device 60, a radiator 70, a humidification module 80, valves 91, 92, pumps 101 to 105, a control unit 110, a dew point sensor 121, a current sensor 122, and a voltage sensor 123.

The reforming device 10 reforms a starting fuel and generates a reformed gas. In the present embodiment, the reforming device 10 generates the reformed gas by using ammonia (NH$_3$) as the starting fuel. A configuration of the reforming device 10 is not particularly limited, provided that the reformed gas can be generated by using ammonia as the starting fuel. The reforming device 10 of the present embodiment includes, for example, a catalytic device 11, a reformer 12, and a heat exchanger 13.

The catalytic device 11, reformer 12, and heat exchanger 13 are connected in this order. The catalytic device 11 includes a catalyst that enhances oxidation of ammonia and a heater 16a for heating the catalyst. Thus, the catalytic device 11 is an electrically heated catalyst (EHC). A power supply source of the heater 16a is the secondary cell 20.

The reformer 12 includes a catalyst for converting ammonia into hydrogen and nitrogen. The heat exchanger 13 includes a heater 16b. The heat exchanger 13 performs heat exchange with liquid ammonia supplied from the storage tank 30 to the catalytic device 11. A power supply source for the heater 16b is the secondary cell 20.

The storage tank 30 stores the liquid ammonia. The intermediate section of the flow path connecting the storage tank 30 and the catalytic device 11 passes inside the heat exchanger 13. The valve 91 and the pump 101 are provided in the flow path connecting the storage tank 30 and the catalytic device 11.

The NH$_3$ treatment device 40 serves to treat ammonia contained in the reformed gas generated by the reforming device 10. For example, the NH$_3$ treatment device 40 is provided with an ammonia adsorbent for removing ammonia contained in the reformed gas. The hydrogen recovery device 60 recovers hydrogen from the fuel off-gas of the fuel cell 50. More specifically, the hydrogen recovery device 60 has a hydrogen separation membrane. The hydrogen separation membrane selectively transmits hydrogen. The type of hydrogen separation membrane is not particularly limited. For example, a hydrogen separation membrane of a palladium alloy system can be used.

The radiator 70 cools the coolant of the fuel cell 50. The radiator 70 and the fuel cell 50 are connected by a flow path serving to circulate the coolant. A pump 103 for circulating the coolant is disposed in this flow path. This flow path is connected to the first coolant flow path 210 and second coolant flow path 211 (see FIG. 1) of the fuel cell 50.

The humidifying module 80 humidifies the oxidizer gas supplied to the fuel cell 50. In the present embodiment, the humidifying module 80 humidifies the oxidizer gas by using water vapors contained in the oxidizer off-gas. A valve 92 for controlling a flow rate of the oxidizer gas is disposed between the humidifying module 80 and the oxidizer off-gas outlet of the fuel cell 50.

The control unit 110 is a microcomputer including a central processing unit (CPU) as an operational unit, a read only memory (ROM) as a nonvolatile storage unit, and a random access memory (RAM) as a volatile storage unit. The control unit 110 controls the operation of the heater 16a, heater 16b, valves 91, 92, and pumps 101 to 105. The dew point sensor 121 is disposed between the $NH_3$ treatment device 40 and the fuel cell 50, detects a dew point of the fuel gas, and sends the result obtained to the control unit 110. The current sensor 122 detects a generated current of the fuel cell 50 and sends the result obtained to the control unit 110. The voltage sensor 123 detects the generated voltage of the fuel cell 50 and sends the result obtained to the control unit 110.

A start processing of the fuel cell system 5 will be explained below. The start processing is a processing performed from the start of the fuel cell system 5 to the generation by the reformed gas by the reforming device 10. In the start processing, the control unit 110 actuates the heater 16a and the heater 16b. As a result, the catalytic device 11 and the heat exchanger 13 are heated.

After the temperature of the catalyst of the catalytic device 11 has reached the first temperature due to heating performed by the heater 16a, the control unit 110 controls the valve 91 to an open state and controls the pump 101 so that ammonia is supplied from the storage tank 30 in a predetermined amount to the catalytic device 11. Further, the control unit 110 controls the pump 102 so that air is supplied in a predetermined amount to the catalytic device 11. The first temperature is not particularly limited, provided that catalytic activity of the catalytic device 11 can be demonstrated. For example, in the present embodiment, the first temperature is set to any value within a range of 200° C. to 300° C.

When the valve 91 is controlled to an open state and the pump 101 is actuated, ammonia present in a liquid state in the storage tank 30 is heated and vaporized by heat exchange with the heater 16b in the heat exchanger 13 and then flows into the catalytic device 11. In the catalytic device 11, the ammonia introduced by the pump 101 is mixed with the air introduced by the pump 102 and an oxidation reaction represented by the following Expression (1) proceeds under activation by the catalyst of the catalytic device 11 (the reaction heat is described in a Chemical Handbook (published by the Chemical Society of Japan). In this case, the reaction heat is conducted to the reformer 12 adjacent to the catalytic device 11 and heats the reformer 12.

$$NH_3 + 3/4 O_2 \rightarrow 1/2 N_2 + 3/2 H_2O + 316.62 \text{ kJ/mol} \qquad (1)$$

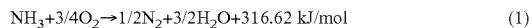

When the temperature of the reformer 12 reaches the second temperature, the control unit 110 stops the heater 16a. The second temperature is not particularly limited (the reaction heat is described in a Chemical Handbook (published by the Chemical Society of Japan), provided it is a temperature at which a reforming reaction represented by the following Expression (2) proceeds in the reformer 12. In the present embodiment, the second temperature is, for example, any temperature within a range of 700° C. to 800° C. The control unit 110 then stops the heater 16a and the heater 16b. The start processing is conducted by the above-described process.

$$NH_3 \rightarrow 1/2 N_2 + 3/2 H_2 - 46.11 \text{ kJ/mol} \qquad (2)$$

Ammonia and air are continuously supplied to the catalytic device 11 even after the heater 16a and the heater 16b have been stopped. In this case, the oxidation reaction represented by Expression (1) continues in the catalytic device 11 due to auto-thermal reforming (auto-heat-exchange reforming). Where the heat exchanger 13 receives heat from the reformer 12 that has received heat from the catalytic device 11, liquid ammonia flowing inside the heat exchanger 13 is vaporized. Part of the ammonia flowing into the catalytic device 11 participates in an oxidation action represented by Expression (1) with the air in the catalytic device 11. The ammonia that has not participated in the oxidation reaction represented by Expression (1) in the catalytic device 11 flows into the reformer 12 and is converted into the reformed gas by the reforming reaction represented by Expression (2) that proceeds in the reformer 12.

The reformed gas passes thorough the heat exchanger 13 and is then introduced into the $NH_3$ treatment device 40. In the $NH_3$ treatment device 40, ammonia is removed from the reformed gas. The reformed gas from which ammonia has been removed is supplied as a fuel gas to a fuel gas flow path 208 (see FIG. 1) of the fuel cell 50. The dew point sensor 121 detects a dew point of the fuel gas supplied to the fuel cell 50 and sends the detection result to the control unit 110. Therefore, the dew point sensor 121 functions as a wetness state detection unit.

A stationary processing of the fuel cell system 5 will be described below. The stationary processing is performed after the above-described start processing is completed. After the start processing is completed, the control unit 110 controls the pump 105 so that a predetermined amount of air is supplied to the oxidizer gas flow path 209 of the fuel cell 50. As a result, power generation is performed in the fuel cell 50.

The pump 104 supplies the fuel off-gas to the hydrogen recovery device 60 in response to the command from the control unit 110. The hydrogen recovery device 60 supplies the introduced fuel off-gas to the hydrogen separation membrane and recovers the gas that has passed through the hydrogen separation membrane, thereby recovering hydrogen from the fuel off-gas and supplying the recovered hydrogen again into the fuel gas flow path 208 (see FIG. 1) of the fuel cell 50. The fuel off-gas from which hydrogen has been removed is discharged by the hydrogen recovery deice 60 to the outside of the fuel cell system 5.

The control unit 110 controls the opening of the valve 92. As a result, water contained in the oxidizer off-gas is introduced in the humidification module 80. The humidification module 80 uses water contained in the oxidizer off-gas and humidifies the oxidizer gas. The pump 103 circulates the coolant in response to the command from the control unit 110. Therefore, the coolant is cooled by the radiator 70. As a result, the fuel cell 50 is maintained at a predetermined temperature.

It is assumed that an oxidation reaction of ammonia represented by Expression (1) above does not proceed and only thermal decomposition reaction of ammonia represented by Expression (2) above proceeds in the reforming device 10. In this case, no water vapors are contained in the fuel gas supplied to the fuel cell 50. Therefore, the electrolyte membrane 201 of the fuel cell 50 can dry up and the power generation efficiency can decrease. Where the oxidation reaction of ammonia represented by Expression (1) is intensively conducted to introduce water vapor in the fuel gas, no hydrogen is generated in the reaction represented by Expression (1) and therefore the ammonia utilization efficiency decreases. Accordingly, the wetness state of the electrolyte membrane 201 is controlled, while maintaining the utilization efficiency of ammonia, by controlling the Air/$NH_3$ ratio supplied to the reforming device 10.

In the present embodiment, the control unit 110 controls the Air/$NH_3$ ratio so that the dew point temperature of the fuel gas enters the predetermined temperature range. As a result, the electrolyte membrane 201 can be prevented from drying up, while suppressing flooding. The Air/$NH_3$ ratio can be controlled by using the control command values to the pump 101 and pump 102. Therefore, the control unit 110 and the pumps 101, 102 function as a supply amount ratio control unit for controlling the supply amount ratio of oxygen and ammonia to the reforming device 10.

As an example, when the fuel gas temperature is 80° C., the dew point temperature of fuel gas is preferably within a range from a temperature close to 45° C. to a temperature close to 50° C. The dew point temperature range can be appropriately changed according to the type and standard of the fuel cell 50. In this case, the water vapor ratio in the fuel gas can be controlled by controlling the Air/$NH_3$ ratio. Where the water vapor ratio in the fuel gas can be controlled, it is possible to control the relative humidity of the fuel gas and also control the dew point temperature of the fuel gas. Table 1 shows an Air/$NH_3$ ratio in the case in which the dew point temperature is controlled to 45° C. and 50° C. As shown in Table 1, when the fuel gas temperature is 80° C., the dew point temperature of the fuel gas can be controlled to 45° C. by controlling the Air/$NH_3$ ratio to 0.62. When the fuel gas temperature is 80° C., the dew point temperature of the fuel gas can be controlled to 50° C. by controlling the Air/$NH_3$ ratio to 0.90.

TABLE 1

| Item | Dew point temperature: 45° C. | Dew point temperature: 50° C. |
|---|---|---|
| Water vapor ratio in reformed gas (%) | 10.5 | 13.9 |
| Relative humidity of reformed gas | 20.3 | 26.1 |
| Air/$NH_3$ (mol ratio) | 0.62 | 0.90 |

Auto-thermal reforming performed in the reforming device 10 will be described below. The amount of heat generation in the reforming device 10 should be controlled to be larger than the amount of heat absorption in order to maintain auto-thermal reforming in the reforming device 10. The amount of heat generation in the reforming device 10 includes an amount of heat of the oxidation reaction of ammonia represented by Expression (1) and an amount of heat emitted by heat exchange of the reformed gas in the heat exchanger 13. The amount of heat absorption in the reforming device 10 includes an amount of heat of the thermal decomposition reaction of ammonia represented by Expression (2) and an amount of heat absorbed when the temperature of air and ammonia supplied to the reforming device 10 rises.

Table 2 shows a specific heat of components supplied to the reforming device 10 and a specific heat of components discharged from the reforming device 10. An Air/$NH_3$ ratio at which the amount of heat generation and the amount of heat absorption in the reforming unit 10 become equal to each other is determined on the basis of the specific heat shown in Table 2, reaction heat amount represented by Expression (1), and reaction heat amount represented by Expression (2). Tables 3 to 5 show the amount of heat absorption in the reforming unit 10. Table 3 shows an amount of heat absorption in the case in which the temperature of ammonia and air rises from −33° C. to 750° C. in the heat exchanger 13. Table 4 shows the latent heat of vaporization of ammonia and the amount of heat absorption during decomposition reaction of ammonia. Table 5 shows a total amount of heat absorption.

Tables 6 to 8 show the amount of heat generation in the reforming unit 10. Table 6 shows the amount of heat emission (amount of heat generation) in the case in which the temperature of components in the reformed gas decreases from 750° C. to 80° C. Table 7 shows the amount of heat generation during oxidation of ammonia. Table 8 shows a total amount of heat generation. Table 9 shows the Air/$NH_3$ ratio in the case in which the amount of heat absorption is equal to the amount of heat generation in the reforming unit 10. Where the Air/$NH_3$ ratio is made 0.600, an equilibrium between the amount of heat absorption and the amount of heat generation in the reforming unit 10 can be obtained.

TABLE 2

| Component | Specific heat (J/mol/K) |
|---|---|
| $NH_3$ | 35.06 |
| Air | 29.14 |
| $H_2$ | 28.82 |
| $H_2O$ (g) | 33.58 |
| $N_2$ | 29.07 |

TABLE 3

−33° C. → 750° C.

| | mol | Amount of heat absorption (kJ/mol) |
|---|---|---|
| $NH_3$ | 1.00 | 27.45 |
| Air | 0.60 | 13.69 |
| Total | 1.6 | 41.14 |

TABLE 4

| | Amount of heat absorption (kJ/mol) | Amount of heat absorption (kJ) |
|---|---|---|
| Latent heat of $NH_3$ vaporization | 21.59 | 21.59 (per 1 mol) |
| $NH_3$ decomposition reaction | 46.11 | 38.38 (per 0.832 mol) |
| Total | | 59.97 |

TABLE 5

| | Amount of heat absorption (kJ/mol) |
|---|---|
| Heating of components | 41.14 |
| $NH_3$ decomposition | 59.97 |
| Total | 101.11 |

TABLE 6

750° C. → 80° C.

|  | mol | Amount of heat generation (kJ/mol) |
|---|---|---|
| $N_2$ ($NH_3$ decomposition) | 0.416 | 8.11 |
| $N_2$ ($NH_3$ oxidation) | 0.084 | 1.63 |
| $N_2$ (Air 79%) | 0.473 | 9.21 |
| $H_2O$ (g) | 0.251 | 5.65 |
| $H_2$ | 1.249 | 24.11 |
| Total | 2.473 | 48.71 |

TABLE 7

$NH_3$ oxidation reaction

| mol | Amount of heat generation (kJ/mol) |
|---|---|
| 1 | 316.62 |
| 0.168 | 53.06 |

TABLE 8

|  | Amount of heat generation (kJ/mol) |
|---|---|
| Heat emission by components | 48.71 |
| $NH_3$ oxidation | 53.06 |
| Total | 101.77 |

TABLE 9

|  | mol |  |  |  |
|---|---|---|---|---|
| $NH_3$ | 1.000 | → | $O_2/NH_3$ ratio | 0.126 |
| $O_2$ | 0.126 |  | Air/$NH_3$ ratio | 0.600 |

The Air/$NH_3$ ratio may be controlled by taking into account the amount of heat emission from the reforming device 10. Tables 10 to 16 show the results obtained in the case in which 10% of the amount of heat generation in the reforming device 10 is dissipated to the outside of the system. Tables 10 to 12 show the amount of heat absorption in the reforming device 10, and Tables 13 to 15 show the amount of heat generation in the reforming device 10. Table 10 shows an amount of heat absorption in the case in which the temperature of ammonia and air rises from −33° C. to 750° C. in the heat exchanger 13. Table 11 shows the latent heat of vaporization of ammonia and the amount of heat absorption during the decomposition reaction. Table 12 shows the total amount of heat absorption.

Tables 13 to 15 show the amount of heat generation in the reforming device 10. Table 13 shows the amount of heat emission (amount of heat generation) in the case in which the temperature of components in the reformed gas decreases from 750° C. to 80° C. Table 14 shows the amount of heat generation during the oxidation reaction of ammonia. Table 15 shows the total amount of heat generation. Table 16 shows an Air/$NH_3$ ratio necessary to establish auto-thermal reforming in the case in which 10% of the amount of heat generation in the reforming device 10 is dissipated to the outside of the system. The auto-thermal reforming can be established by setting the Air/$NH_3$ ratio to 0.720.

TABLE 10

−33° C. → 750° C.

|  | mol | Amount of heat absorption (kJ/mol) |
|---|---|---|
| $NH_3$ | 1.00 | 27.45 |
| Air | 0.72 | 16.43 |
| Total | 1.6 | 43.88 |

TABLE 11

|  | Amount of heat absorption (kJ/mol) | Amount of heat absorption (kJ) |
|---|---|---|
| Latent heat of $NH_3$ vaporization | 21.59 | 21.59 (per 1 mol) |
| $NH_3$ decomposition reaction | 46.11 | 36.84 (per 0.799 mol) |
| Total |  | 58.43 |

TABLE 12

|  | Amount of heat absorption (kJ/mol) |
|---|---|
| Heating of components | 43.88 |
| $NH_3$ decomposition | 58.43 |
| Total | 102.31 |

TABLE 13

750° C. → 80° C.

|  | mol | Amount of heat generation (kJ/mol) |
|---|---|---|
| $N_2$ ($NH_3$ decomposition) | 0.3995 | 7.78 |
| $N_2$ ($NH_3$ oxidation) | 0.101 | 1.96 |
| $N_2$ (Air 79%) | 0.567 | 11.05 |
| $H_2O$ (g) | 0.302 | 6.79 |
| $H_2$ | 1.198 | 23.14 |
| Total | 2.567 | 50.72 |

TABLE 14

$NH_3$ oxidation reaction

| mol | Amount of heat generation (kJ/mol) |
|---|---|
| 1 | 316.62 |
| 0.201 | 63.67 |

TABLE 15

|  | Amount of heat generation (kJ/mol) |
|---|---|
| Heat emission by components | 50.72 |
| $NH_3$ oxidation | 63.67 |
| Total | 114.39 |

TABLE 16

| | mol | | | |
|---|---|---|---|---|
| $NH_3$ | 1.000 | → | $O_2/NH_3$ ratio | 0.151 |
| $O_2$ | 0.151 | | $Air/NH_3$ ratio | 0.720 |

The Air/NH$_3$ ratio based on dew point temperature and auto-thermal reforming are arranged in Table 17. As shown in Table 17, under a condition of a fuel gas temperature of 80 degrees, the Air/NH$_3$ ratio may be controlled from 0.62 to 0.90 in order to control the dew point temperature to a range of from 45° C. to 50° C. An Air/NH$_3$ ratio of 0.60 in the case of a heat balance of ±0 is also allowed.

TABLE 17

Figure 3:
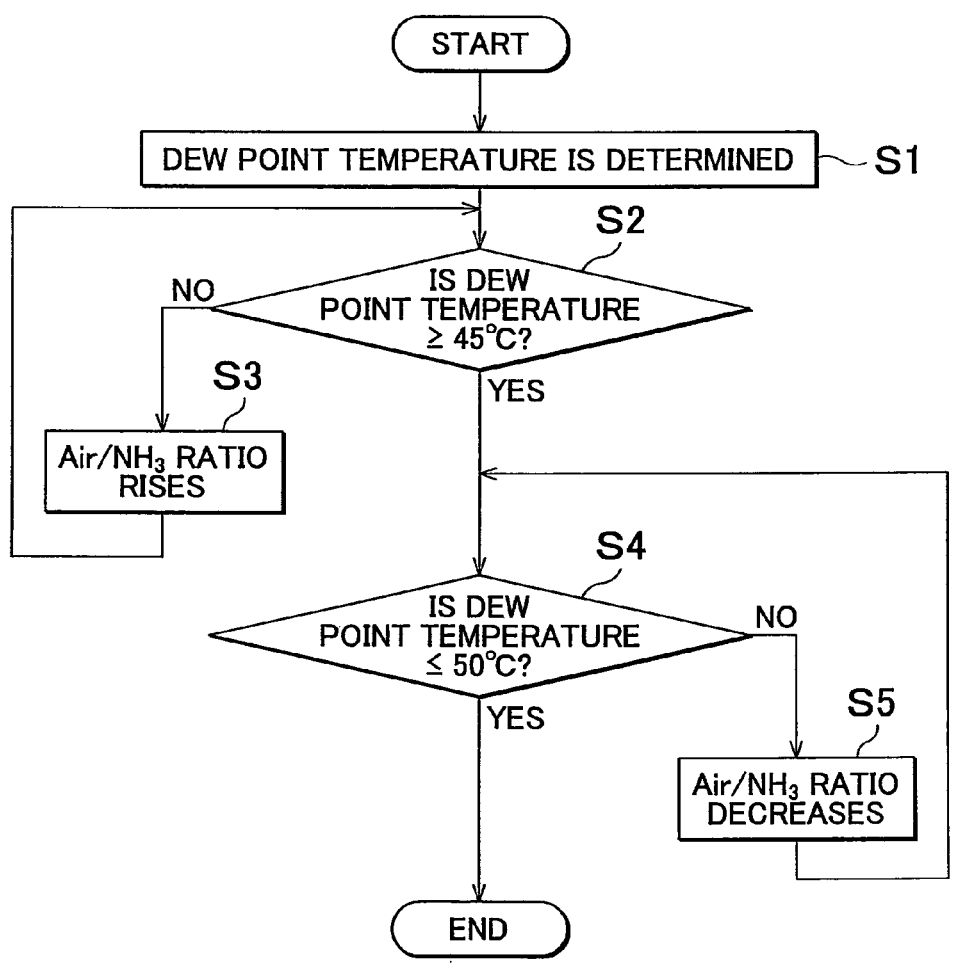
FIG. 3 is a flowchart relating to the case in which an Air/NH$_3$ ratio is controlled according to the detection result.

| Item | Heat balance ± 0 | Dew point temperature: 45° C. | When heat emission is 10% | Dew point temperature: 50° C. | Complete oxidation reaction |
|---|---|---|---|---|---|
| Air/NH$_3$ ratio (mol ratio) | 0.60 | 0.62 | 0.72 | 0.90 | 3.58 |
| Ratio of water vapor in reformed gas (%) | 10.2 | 10.5 | 11.7 | 13.9 | 31.1 |
| Relative humidity in reformed gas (RH) | 19.7 | 20.3 | 22.4 | 26.1 | 50.7 |
| Dew point temperature (° C.) | 44.5 | 45.0 | 47.0 | 50.0 | 64.1 |
| Allowed heat emission ratio (%) | 0.7 | 2.4 | 10.5 | 22.0 | — |

Where the oxidation reaction efficiency or thermal decomposition efficiency of ammonia varies, the desired dew point temperature sometimes cannot be obtained even when the Air/NH$_3$ ratio is controlled. In such a case, the Air/NH$_3$ ratio may be feedback controlled according to the detection result of the dew point sensor 121. FIG. 3 shows an example of a flowchart relating to the case in which the Air/NH$_3$ ratio is controlled according to the detection result of the dew point sensor 121. The flowchart shown in FIG. 3 is, for example, periodically executed in the course of stationary processing. As shown in FIG. 3, the control unit 110 acquires the detection result of the dew point sensor 121 (step S1). The control unit 110 can thus detect the dew point temperature of the fuel gas.

The control unit 110 then determines whether the dew point temperature of the fuel gas is equal to or higher than 45° C. (step S2). Where the dew point temperature is not determined in step S2 to be equal to or higher than 45° C., the control unit 110 controls the pumps 101, 102 so that the Air/NH$_3$ ratio rises (step S3). As a result, the content of the water vapor in the fuel gas can be increased. Then, the control unit 110 executes step S2 again. Where the dew point temperature is determined in step S2 to be equal to or higher than 45° C., the control unit 110 determines whether the dew point temperature is equal to or lower than 50° C. (step S4).

Where the dew point temperature is not determined in step S4 to be equal to or lower than 50° C., the control unit 110 controls the pumps 101, 102 so that the Air/NH$_3$ ratio decreases (step S5). As a result, the content of the water vapor in the fuel gas can be decreased. Then, the control unit 110 executes step S4 again. Where the dew point temperature is determined in step S4 to be equal to or lower than 50° C., the control unit 110 ends executing the flowchart. With the flowchart shown in FIG. 3, the dew point temperature of the fuel gas can be controlled to the predetermined range.

Figure 4:
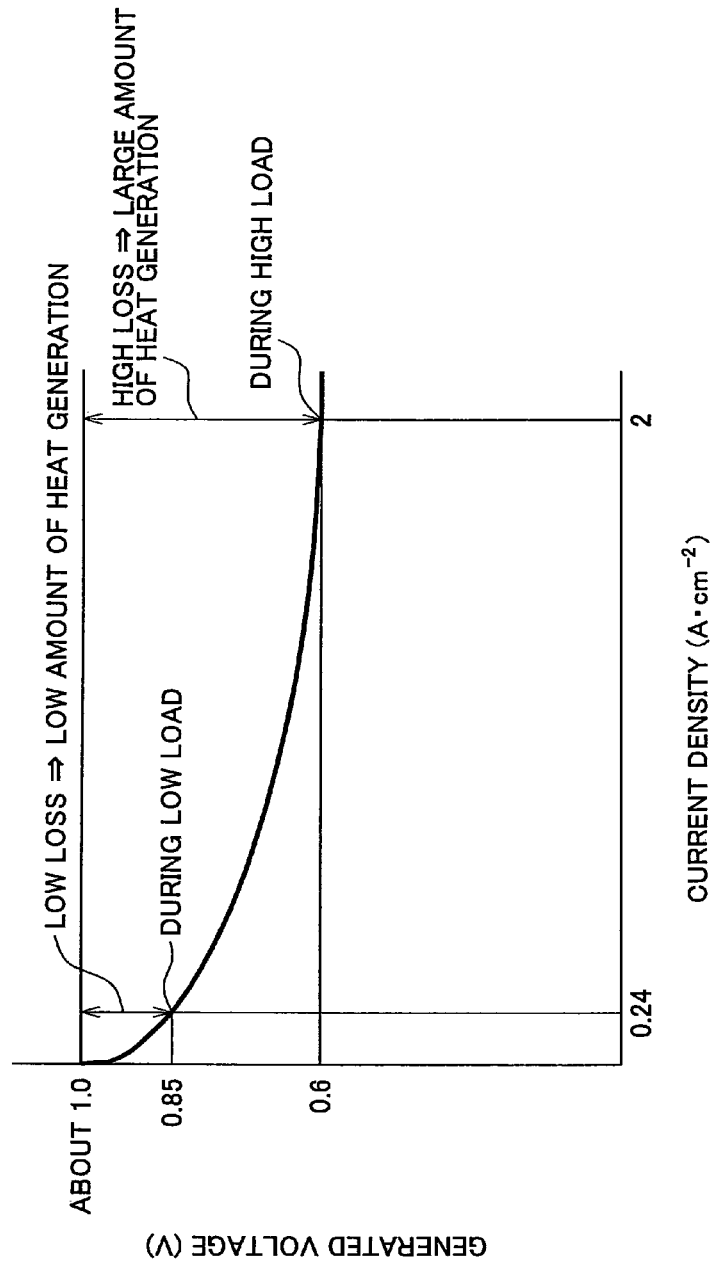
FIG. 4 illustrates the relationship between a current density and a generated voltage in a fuel cell.

The case in which an output of the fuel cell 50 is taken into account when the Air/NH$_3$ ratio is controlled is described below. FIG. 4 shows the relationship between a current density and a generated voltage of the fuel cell 50. In FIG. 4, the current density is plotted against the abscissa, and the generated voltage is plotted against the ordinate. As shown in FIG. 4, the generated voltage increases with the decrease in current density and decreases with the increase in current density. Therefore, when the output density of the fuel cell 50 is low, the power generation efficiency of the fuel cell 50 increases and loss decreases. In this case, the amount of power generation of the fuel cell 50 decreases. As a result, flooding can easily occur. By contrast, when the output density of the fuel cell 50 is high, the power generation efficiency of the fuel cell 50 decreases and loss increases. In this case, the amount of power generation of the fuel cell 50 increases. As a result, the electrolyte membrane 201 can easily dry up.

Accordingly, when the output density of the fuel cell 50 is equal to or lower than a predetermined value, a lower Air/NH$_3$ ratio may be set and the amount of water generated in the course of power generation may be reduced. In this case, the inhibition of hydrogen gas diffusion by the occurrence of flooding can be prevented. When the output density of the fuel cell 50 is equal to or higher than the predetermined value, a higher Air/NH$_3$ ratio value may be set and the amount of water generated in the course of power generation may be increased. In this case, drying of the electrolyte membrane 201 can be inhibited.

Figure 5:
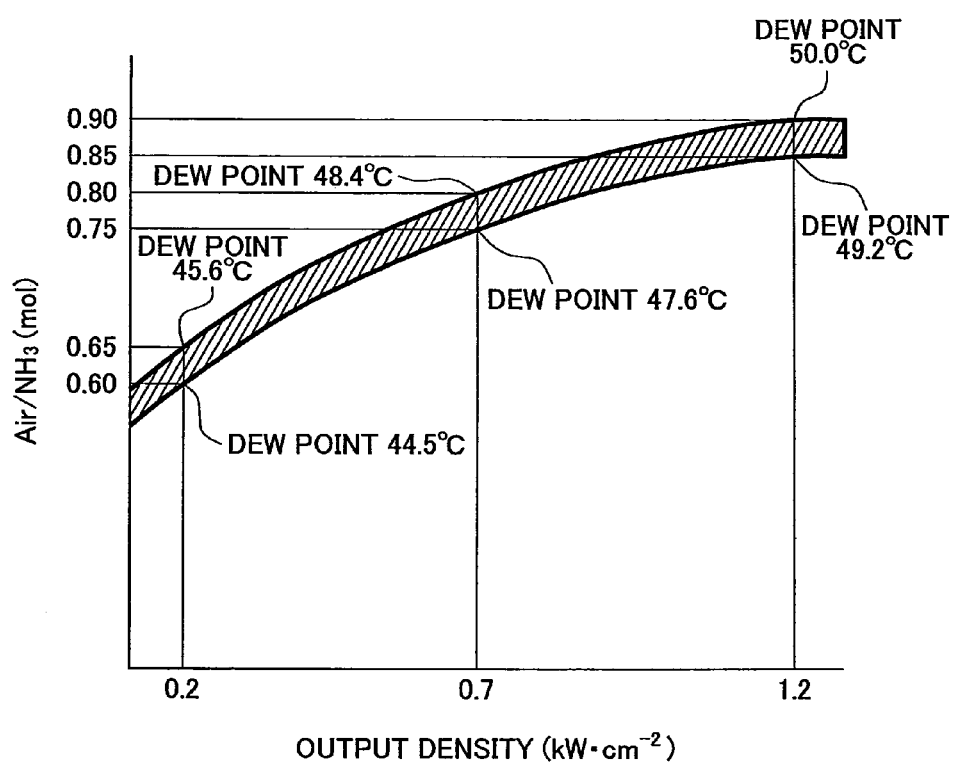
FIG. 5 shows an Air/NH$_3$ ratio in the case in which an output density of the fuel cell is taken into account.

FIG. 5 shows an Air/NH$_3$ ratio in the case in which the output density of the fuel cell 50 is taken into account. In FIG. 5, the output density of the fuel cell 50 is plotted against the abscissa and the Air/NH$_3$ ratio is plotted against the ordinate. As shown in FIG. 5, when the output density of the fuel cell 50 is high, it is preferred that the dew point temperature of the fuel gas be controlled to a high value by increasing the Air/NH$_3$ ratio. For example, when the output density of the fuel cell 50 is 1.2 kW/cm$^2$, it is preferred that the Air/NH$_3$ ratio be controlled to 0.85 to 0.90 so that the dew point temperature of the fuel gas becomes 49.2° C. to 50.0° C. Further, when the output density of the fuel cell 50 is low, it is preferred that the dew point temperature of the fuel gas be controlled to a low value by decreasing the Air/NH$_3$ ratio. For example, when the output density of the fuel cell 50 is 0.2 kW/cm$^2$, it is preferred that the Air/NH$_3$ ratio be controlled to 0.60 to 0.65 so that the dew point temperature of the fuel gas becomes 44.5° C. to 45.6° C.

FIG. 6 shows an example of a flowchart relating to the case in which the output density of the fuel cell 50 is taken into account. For example, the flowchart shown in FIG. 6 is periodically executed in the course of stationary processing. As shown in FIG. 6, the control unit 110 acquires the generated current of the fuel cell 50 from the current sensor 122 and also acquires the generated voltage of the fuel cell 50 from the voltage sensor 123 (step S11). As a result, the control unit 110 can detect the output density of the fuel cell 50.

The control unit 110 then detects a dew point temperature range corresponding to the output density acquired in step S11 (step S12). The relationship shown in FIG. 5 can be used as the dew point temperature range in this case. The control unit 110 then acquires the detection result of the dew point sensor 121 (step S13). As a result, the control unit 110 can detect the dew point temperature of the fuel gas.

The control unit 110 then determines whether the dew point temperature is equal to or higher than a lower limit of the dew point temperature range determined in step S12 (step S14). Where the dew point temperature is not determined in step S14 to be equal to or higher than the lower limit of the dew point temperature range, the control unit 110 controls the pumps 101, 102 so that the Air/NH$_3$ ratio rises (step S15). As a result, the content of water vapor in the fuel gas can be increased. The control unit 110 then executes step S14 again. Where the dew point temperature is determined in step S14 to be equal to or higher than the lower limit of the dew point temperature range, the control unit 110 determines whether the dew point temperature is equal to or lower than an upper limit of the dew point temperature range (step S16).

Where the dew point temperature is not determined in step S16 to be equal to or lower than the upper limit of the dew point temperature range, the control unit 110 controls the pumps 101, 102 so that the Air/NH$_3$ ratio decreases (step S17). As a result, the content of water vapor in the fuel gas can be decreased. The control unit 110 then executes step S16 again. Where the dew point temperature is determined in step S17 to be equal to or lower than the upper limit of the dew point temperature range, the control unit 110 ends executing the flowchart. With the flowchart shown in FIG. 6, the dew point temperature of the fuel gas can be controlled to the optimum range.

Figure 7A:
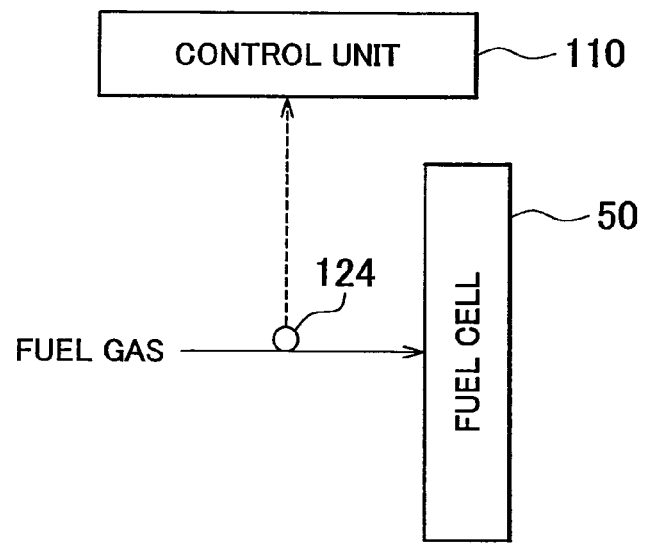
FIG. 7A and FIG. 7B illustrate another example of the wetness state detection unit.
Figure 7B:
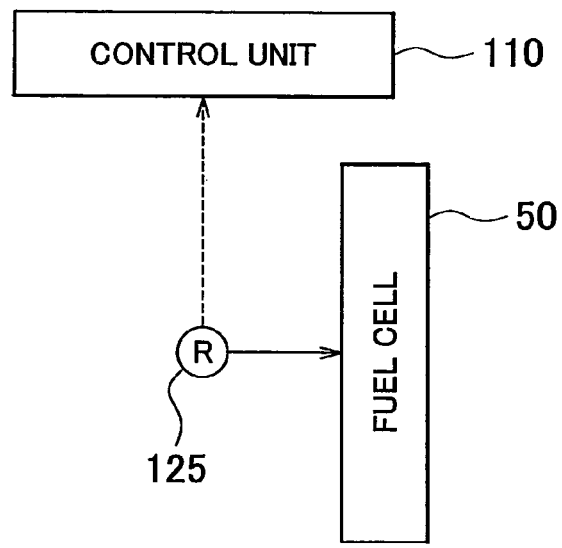

In the above-described embodiment, the dew point sensor is used as a wetness state detection means for detecting a wetness state of the fuel cell 50, but such configuration is not limiting. For example, as shown in FIG. 7A, a humidity sensor 124 that detects a relative humidity of the fuel gas or fuel off-gas may be also used as the wetness state detection means. Further, a humidity sensor that detects a relative humidity of the oxidizer gas or oxidizer off-gas may be also used as the wetness state detection means. As shown in FIG. 7B, a resistance sensor 125 that detects a membrane resistance of the electrolyte membrane 201 of the fuel cell 50 may be also used as the wetness state detection means.

In the above-described embodiment, the attention is focused on the output density as an output of the fuel cell 50, but such configuration is not limiting. For example, the generated voltage or current density during power generation of the fuel cell 50 may be also used as the output of the fuel cell 50.

In some cases the wetness state of the fuel cell 50 is not determined only by the output of the fuel cell 50. For example, the wetness state of the fuel cell 50 can be also affected by a temperature or stoichiometric ratio of the fuel cell 50. The fuel cell 50 dries up easily as the temperature rises, but flooding can easily occur when the temperature is low. Further, where the stoichiometric ratio is high, the amount of gas supplied to the fuel cell 50 increases and therefore the fuel cell can easily dry up. Where the stoichiometric ratio is low, the amount of gas supplied to the fuel cell 50 becomes insufficient and flooding can easily occur.

Therefore, in some cases the wetness density of the fuel cell 50 cannot be determined only by the output of the fuel cell 50. Accordingly, a map of the relationship between the operation state and wetness state of the fuel 50 cell may be created in advance and the wetness state of the fuel cell 50 may be determined to control the Air/NH$_3$ ratio on the basis of the map. Further, the relationship between the wetness state and the output of the fuel cell 50 may be measured in advance (or may be predicted by simulation at the design stage) and the Air/NH$_3$ ratio may be controlled on the basis of the results obtained. A coolant temperature can be used as the temperature of the fuel cell 50.

The invention claimed is:

1. A fuel cell system, comprising:
a solid polymer fuel cell that generates power by using a hydrogen-containing gas as a fuel gas;
a reformer that generates the fuel gas by reforming ammonia;
a supply amount ratio control unit that is programmed to control a supply amount ratio of oxygen and ammonia to be supplied to the reformer; and
a wetness state detection unit that detects a wetness state of the fuel cell, wherein
the supply amount ratio control unit is programmed to control the supply amount ratio of oxygen and ammonia to be supplied to the reformer according to the detection result of the wetness state detection unit,
wherein the supply amount ratio control unit is programmed to increase the ratio of oxygen and ammonia when dew point temperature detected by the wetness state detection unit is less than a first temperature thereby controlling a content of a water vapor in the fuel gas to be supplied to the fuel cell, and wherein the supply amount ratio control unit is further programmed to decrease the ratio of oxygen and ammonia when dew point temperature detected by the wetness state detection unit is greater than a second temperature thereby further controlling the content of the water vapor in the fuel gas to be supplied to the fuel cell.

2. The fuel cell system according to claim 1, wherein the supply amount ratio control unit is programmed to control the supply amount ratio of oxygen and ammonia to be supplied to the reformer in a predetermined range according to the detection result of the wetness state detection unit.

3. The fuel cell system according to claim 1, wherein the wetness state detection unit is a dew point sensor that detects a dew point of the fuel gas.

4. The fuel cell system according to claim 1, wherein the supply amount ratio control unit controls a supply amount ratio of oxygen and ammonia to be supplied to the reformer to a value equal to or less than 0.90.

5. The fuel cell system according to claim 1, wherein the wetness state detection unit detects a humidity of the fuel gas to be supplied to the fuel cell.

6. The fuel cell system according to claim 1, wherein the first temperature and the second temperature increase as an output density of the fuel cell increases.

* * * * *